United States Patent
Dunton et al.

[15] 3,653,695
[45] Apr. 4, 1972

[54] HIGH TEMPERATURE PIPE COUPLING

[72] Inventors: John T. Dunton; Richard G. Van Houtte, both of Bradford, Pa.

[73] Assignee: Dresser Industries, Inc., Dallas, Tex.

[22] Filed: Aug. 19, 1970

[21] Appl. No.: 64,956

[52] U.S. Cl. ..............................285/340, 285/342, 285/369
[51] Int. Cl. ...................................................F16l 19/08
[58] Field of Search.................285/340, 348, 354, 369, 177, 285/342, 212, 211, 343

[56] References Cited

UNITED STATES PATENTS

| | | | |
|---|---|---|---|
| 3,291,510 | 12/1966 | Kody | 285/348 X |
| 3,092,404 | 6/1963 | MacWilliam | 285/354 X |
| 2,567,527 | 9/1951 | Parks | 285/348 X |
| 2,201,372 | 5/1940 | Miller | 285/340 X |
| 2,724,602 | 11/1955 | Cavey et al. | 285/354 X |
| 3,441,297 | 4/1969 | Koski | 285/342 |

FOREIGN PATENTS OR APPLICATIONS

| | | | |
|---|---|---|---|
| 409,710 | 2/1945 | Italy | 285/348 |
| 42,519 | 5/1933 | France | 285/177 |
| 361,170 | 5/1962 | Switzerland | 285/354 |
| 1,335,121 | 7/1963 | France | 285/340 |
| 151,559 | 11/1937 | Austria | 285/342 |

*Primary Examiner*—Thomas F. Callaghan
*Attorney*—Robert W. Mayer, Thomas P. Hubbard, Jr., Daniel Rubin, Raymond T. Majesko, Roy L. Van Winkle, William E. Johnson, Jr. and Eddie E. Scott

[57] ABSTRACT

A coupling member for joining plain end pipe and adapted for maintaining sealing pressure throughout a swing range of temperatures between about normal room temperature to on the order of 300° F. and above. A cylindrical sleeve is provided for overlying opposite pipe ends and is outwardly flared at its ends to define annular cavities in which to receive annular gaskets. Thimble-nuts screw threaded to the exterior of each sleeve end compress the gasket thereat radially and axially inward of the cavity to effect a required gasket sealing pressure. By a predetermined space relation of cavity and gasket the latter when fully compressed, will consume less than the available axial extent of the cavity. The unused axial cavity extent at room temperature permits unstressed gasket expansion as temperatures increase.

6 Claims, 7 Drawing Figures

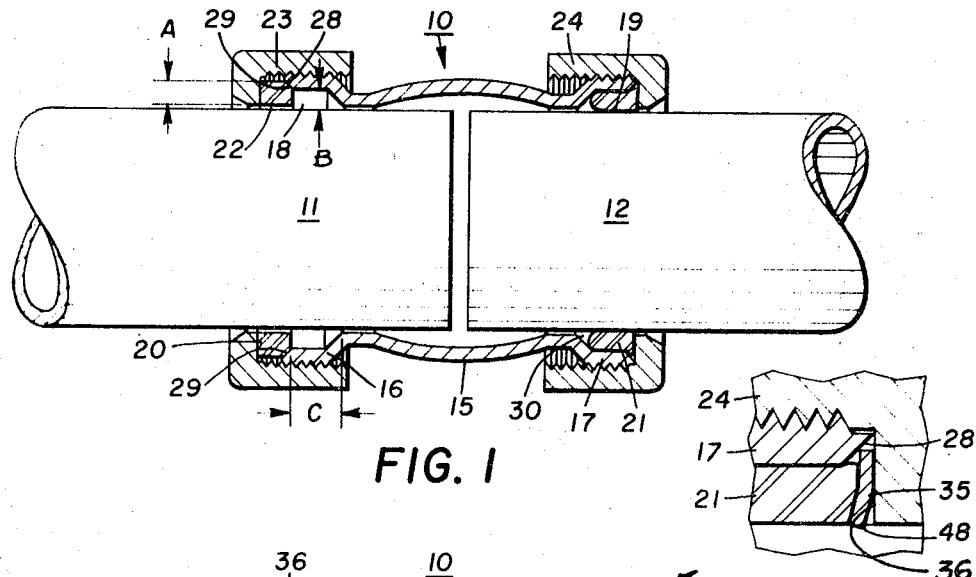
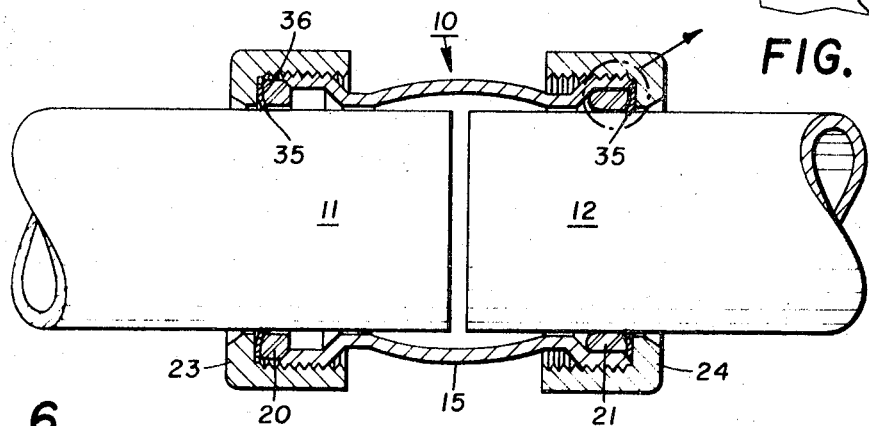
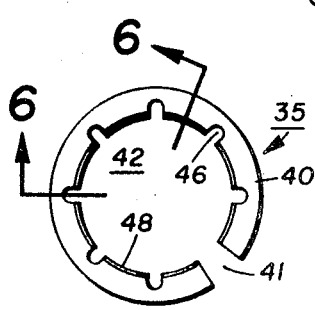
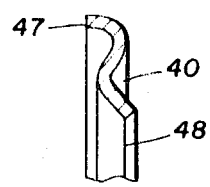
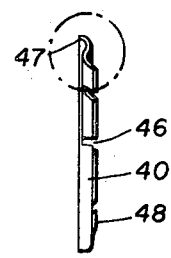

HIGH TEMPERATURE PIPE COUPLING

BACKGROUND OF THE INVENTION

The art to which the invention pertains includes the art of piping and pipe couplings for the formation of pipe joints.

The use of couplings and the like for forming of pipe joints is well known. By means of prior art devices, it has been usual to couple pipes by either bolting or mechanically crimping or swaging to constrict the coupling into a pressure tight seal with opposing pipe sections. Where gaskets are employed, these prior types draw or force the contained gasket into tight leak proof engagement with the respective pipe sections. The latter type are exemplified in the prior art by U.S. Pat. Nos. 3,149,861; 3,210,102; 3,244,441; 3,103,068; and 2,479,702.

Generally speaking such prior gasketed couplings effect gasket pressures sufficient to provide a leak proof joint under operating pressures to be encountered for use at temperatures expected to be within the normal room temperature range, i.e., about 65°–95° F. When however, such couplings after appropriate gasket pressure has been applied at room temperature are exposed to elevated temperatures on the order of about 300° F. and above, the confined gasket (normally characterized by a much higher thermal coefficient of expansion than that of the surrounding metal coupling) incurs increased stress forces much beyond that which was contemplated. As a consequence of increasing gasket compression with temperature, the gasket manages to extrude in all which directions with an end result that on recooling to room temperatures, the initial gasket pressure set at room temperature is not restored. Instead, a substantially reduced gasket pressure results far less than necessary to maintain a leak tight seal at the joint. The ultimate effect thereof as an alternative to leaky joints has been to require continual seal maintenance which, as can be appreciated, does not represent a satisfactory situation. To the contrary, a leaky joint at room temperature can comprise a real safety hazard where line contents of the piping are combustible or toxic.

Attempts at resolving the aforementioned prior art coupling difficulties associated with temperature swings has therefore been without success for coupled conditions requiring a combination of high sealing pressures and exposure to relatively wide temperature swings. A solution directed to the problem of temperature swing alone is exemplified by U.S. Pat. No. 3,149,845 in which an O-ring seal is employed with an enlarged gasket cavity affording uninhibited gasket expansion and contraction with temperature change. Such O-ring seals however, require relatively precision fits onto the received pipe and have therefore been unuseable with plain pipe ends which tend to cut the radially inner gasket periphery when axially assembling the sleeve and gasket over the pipe ends. Use of such O-ring arrangements has therefore been limited to situations where the pipe ends are inwardly chamfered frequently with special finishes in order to avoid cutting the gasket on assembly. Moreover gasket pressure with such an O-ring construction is at the mercy of the interfit formed between the pipe end, gasket and sleeve without any means to increase gasket pressure to a desired level.

SUMMARY

This invention relates to a pipe coupling for joining plain end pipe and affording the combination of settable gasket pressure without loss of gasket pressure on exposure to relatively wide temperature swings. In accordance herewith, the coupling comprises a tubular sleeve annularly enlarged outward at each of its ends to define an annular interior gasket cavity thereat. A gasket of slightly larger exterior diameter than the cavity is wedgedly forced radially and axially inward thereof at room temperature by means of an axially movable thimble-nut screw threaded onto the sleeve periphery. The nut is tightened forcing the gasket into the annular cavity. On reaching the end of nut travel, at which time further axial tightening thereof is not possible, the gasket is at its innermost axial extent within the cavity although the cavity is as yet axially unfilled. Gasket sealing pressure results from the interrelation of radial gasket thickness and radial cavity height without regard to the magnitude of turning torque applied on the nut. The unfilled axial portion of the cavity subsequently accommodates gasket expansion and contraction when subjected to temperature swings such that when room temperature is reverted to no loss of initial sealing pressure occurs. By this simple combination of elements, a solution is achieved whereby both high gasket pressure and high temperature swing can be readily contended with for joining plain-end pipe as to overcome the previous difficulties associated with such prior art devices. Moreover the solution is achieved without the narrow tolerance limitations previously imposed and without need for special finishes on pipe and/or coupling.

It is therefore an object of the invention to provide a novel pipe coupling for joining plain end pipe.

It is a further object of the invention to provide a novel pipe coupling affording the feature of high gasket pressure without incurring pressure loss on exposure to temperature swings.

It is a still further object of the invention to provide a novel pipe coupling as in the aforesaid objects and which is both simple in construction and economical to fabricate in overcoming a serious deficiency of similar purpose couplings of the prior art.

BRIEF DESCRIPTION OF THE DRAWINGS

FIG. 1 is a sectional elevation of a first embodiment of coupling in accordance herewith;

FIG. 2 is a sectional elevation of a second embodiment of coupling in accordance herewith;

FIG. 3 is a fragmentary enlargement of the encircled portion of FIG. 2;

FIG. 4 is a plan view of the lock ring for the embodiment of FIG. 2;

FIG. 5 is a fragmentary enlargement of the lock ring of FIG. 4;

FIG. 6 is a sectional elevation taken substantially along the lines 6—6 of FIG. 4; and FIG. 7 is a fragmentary enlargement of the encircled portion of FIG. 6.

Referring now to FIG. 1, the coupling in accordance herewith is generally designated 10 and is adapted for joining plain end pipe sections 11 and 12 in a pressure-tight joint. Comprising the coupling as to overly the pipe ends is an elongated tubular shell or sleeve 15 annularly flared or enlarged outward at it ends 16 and 17 to define annular interior gasket cavities 18 and 19 thereat. To be received within the cavities are annular gaskets 20 and 21 each consisting of synthetic or natural elastomeric sealing compositions such as rubber, silicone, polyurethane or other suitable and available elastomeric materials. Each gasket has a central aperture 22 for encircling the pipe when received and is adapted to be forced axially and radially inward of the cavity by means of thimble-nuts 23 and 24 screw threaded to the peripheral exterior of sleeve 15. As viewed in FIG. 1 it is to be noted that the left portion of the coupling is illustrated with gasket 20 in its natural uncompressed state to freely receive pipe end 11 through its bore 22. By contrast the right coupling portion of FIG. 1 illustrates gasket 21 in its post-compressed state providing the desired gasket seal between pipe end 12 and coupling sleeve 15.

Critical to an understanding of the invention are several features of physical relationship between gaskets 20 and 21 and gasket cavities 18 and 19 in which the gaskets respectively are to be received. As can be seen with respect to the left portion of FIG. 1, gasket 22, of generally rectangular or trapezoidal cross-section, has an internal diameter of bore 22 slightly larger than the O.D. of pipe 11 but less than the internal diameter of cavity 18. At the same time the external gasket diameter is greater than the internal diameter of cavity 18 resulting in a radial thickness dimension A greater than radial clearance dimension B of cavity 18. Generally A is about 1 ⅓ to 1 ½ B. Moreover the outermost termination of ends 16 and 17 each comprises an annular outward chamfer 28 mutually engaged initially by complementary gasket chamfer 29. This latter relation provides a radially inward component against the gasket as thimble-nut 23 is threadedly advanced axially inward to wedgedly force the gasket into cavity 18 until desired gasket pressure is obtained as aforesaid.

The sealed condition against line content leakage is represented by the right hand portion of FIG. 1 with gasket 21 having been forced axially inward of cavity 19 into joint sealed relation. It is to be noted that despite a seal formation obtained with a sufficiently compressed gasket 21 extending into cavity 19 there still remains an unoccupied axially inward portion of the cavity designated 30. This is assured by initially providing an axial cavity dimension C greater than the axial gasket deformation as will occur to effect ultimate sealing pressure. When the unit thus assembled at room temperature is installed in a piping network and is subsequently exposed to alternating increasing and decreasing temperatures the gaskets, having coefficients of expansion approximately 8 to 10 times that of the coupling per se, can expand and contract uninhibited in the axial space 30. By this means gasket stress is not increased with temperature but is instead maintained constant under a condition of controlled gasket deformation. Consequently when cooled to room temperature from on the order of 300°-1,000° F., gasket pressure is not reduced in the manner of similar purpose devices of the prior art, as to continue to effectively maintain the joint seal without further maintenance.

Referring now to FIGS. 2-7, there is disclosed a second embodiment differing from the previous embodiment only by inclusion of a split lock ring 35 normally situated between the internal radial face 36 of nuts 23 and 24 and the radial axially outer face of gaskets 20 and 21.

Lock ring 35 comprises a ring-like body 40 interrupted from being completely circular by a gap 41 and having a central axial opening 42 generally coextensive with gasket aperture 22. As initially fabricated body 40 on its internal diameter includes a serrated edge formed of a plurality of radially extending angularly displaced notches 46 and an arcuate knife edge 48 between notches. On its faces the ring includes a plurality of concentric sinuously extending bends terminating at its periphery into an axially extending face or lip 47.

The external ring diameter approximately coincides with that of the gasket and is placed axially intervening between each thimble-nut and its respective gasket with ring lip 47 positioned facing outwardly toward radial nut face 36. As each thimble-nut is tightened, its lock ring is forced axially inward in conjunction with the gasket thereat until its rear face engages sleeve chamfer 28 whereupon further inward advancement of the thimble-nut squeezes the ring against sleeve 15. This final squeeze gradually eliminates the sinuous bends in the ring while forcing inner edge 48 into a biting grip with the pipe wall thereat in a manner most clearly illustrated in FIG. 3. When in this relation, the lock ring serves to prevent inadvertent outward movement caused by line pressure as might otherwise occur.

By the above description there has been disclosed a novel pipe coupling unit adapted for joining plain end pipe in a high pressure seal readily able to contend with elevating temperature swings without consequent loss of sealing pressure on cool down. Despite simplicity of the device, it overcomes a long standing need in the art for a pipe coupling unit able to afford the combination of presettable high gasket pressure without adverse effects from temperature swings to which the coupling might likely be exposed. Not only is maintenance of these joints substantially reduced as compared to previous coupled joints, but the previous loss of line content from leaky joints and associated human hazard is substantially eliminated. Therefore the device is simple and relatively inexpensive in solving a long standing problem in the art as being able to concomitantly contend with the aforementioned pressure and temperature conditions. Critical to the invention is the dimensional relationship of sealing gasket to gasket cavity such when the gasket is deformed from compression of the extent required in effecting sealing pressure at room temperature, a portion of the cavity remains unoccupied. The latter cavity portion accommodates subsequent gasket expansion therein in response to elevated temperatures to which the gasket is exposed.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A pipe coupling for the joining of plain end pipe comprising:
   a. a tubular sleeve in which to receive plain end pipe to be joined, said sleeve being enlarged at its ends to define annular gasket cavities terminally defined in the axially endmost direction of the sleeve by a frusto-conical chamfer in the sleeve wall;
   b. an annular elastomeric gasket for each of said cavities, said gasket having a chamfered surface for mutual engagement with said sleeve chamfer and being of size relative to its cavity to deform radially and axially inward of the cavity in response to an axially inward force applied thereagainst;
   c. compression means adapted to act axially against the gasket to force the gasket thereat axially and radially inward of its cavity until deformedly forming a sealed pipe joint of predetermined gasket pressure;
   d. each of the gasket cavities having an axial extent sufficiently greater than the axial deformed extend occupied by the compressed gasket at room temperature to allow substantially further unstressed gasket expansion at elevated temperatures to which the coupling is to be exposed; and
   e. a locking ring axially interposed between at least one gasket and the compression means adjacent thereto, said ring being responsive to the axially imposed force of said compression means to engage said sleeve chamfer and effect a biting grip on the pipe wall thereat.

2. A pipe coupling according to claim 1 in which said compression means comprises thimble-nuts threadedly connected to each of said sleeve ends.

3. A pipe coupling according to claim 1 in which the relative size of said gasket and corresponding cavity comprises a gasket of internal diameter larger than the diameter of received pipe to be joined but less than the internal diameter of the enlarged sleeve wall defining the gasket cavity and of an external diameter larger than the internal diameter of the enlarged sleeve wall defining the gasket cavity.

4. A pipe coupling according to claim 3 in which the radial gasket thickness is in the ratio of about 1 ⅓ to 1 ½ the radial clearance between received pipe O.D. and internal diameter of the enlarged sleeve wall.

5. A pipe coupling according to claim 2 in which the relative size of said gasket and corresponding cavity comprises a gasket of internal diameter larger than the diameter of received pipe to be joined but less than the internal diameter of the enlarged sleeve wall defining the gasket cavity and of an external diameter larger than the internal diameter of the enlarged sleeve wall defining the gasket cavity.

6. A pipe coupling according to claim 5 in which the radial gasket thickness is in the ratio of about 1 ⅓ to 1 ½ the radial clearance between received pipe O.D. and internal diameter of enlarged sleeve wall.

* * * * *